United States Patent
Bauer et al.

(10) Patent No.: US 11,991,146 B2
(45) Date of Patent: May 21, 2024

(54) METHOD AND TRANSMISSION DEVICE FOR DATA TRANSMISSION BETWEEN TWO OR MORE NETWORKS

(71) Applicant: Siemens Mobility GmbH, Bayern (DE)

(72) Inventors: Christian Bauer, Munich (DE);
Matthias Lorenz, Vechelde (DE);
Hermann Seuschek, Munich (DE);
Martin Wimmer, Neubiberg (DE)

(73) Assignee: Siemens Mobility GmbH, Bayern (DE)

( * ) Notice: Subject to any disclaimer, the term of this patent is extended or adjusted under 35 U.S.C. 154(b) by 171 days.

(21) Appl. No.: 17/621,375

(22) PCT Filed: Jun. 16, 2020

(86) PCT No.: PCT/EP2020/066620
§ 371 (c)(1),
(2) Date: Dec. 21, 2021

(87) PCT Pub. No.: WO2020/260070
PCT Pub. Date: Dec. 30, 2020

(65) Prior Publication Data
US 2022/0360558 A1  Nov. 10, 2022

(30) Foreign Application Priority Data
Jun. 27, 2019  (DE) .......................... 102019209342.6

(51) Int. Cl.
*H04L 9/40* (2022.01)
(52) U.S. Cl.
CPC ...... *H04L 63/0209* (2013.01); *H04L 63/0428* (2013.01); *H04L 63/123* (2013.01)
(58) Field of Classification Search
CPC .......................... H04L 63/0209; H04L 63/0428
See application file for complete search history.

(56) References Cited

U.S. PATENT DOCUMENTS 7,707,300 B1 *  4/2010  Champagne ............ H04L 45/38
709/231
8,068,504 B2  11/2011  Brindle et al.
(Continued)

FOREIGN PATENT DOCUMENTS

EP  3713188 A1  9/2020
WO  9946882 A2  9/1999
(Continued)

OTHER PUBLICATIONS

Siemens, "Secure Connectivity", Rail Automation, Retrieved From https://siemens.com/dcu, Published Jun. 26, 2019.
(Continued)

*Primary Examiner* — Chau Le
(74) *Attorney, Agent, or Firm* — Schmeiser, Olsen & Watts, LLP

(57) ABSTRACT

Provided is a method for data transmission between at least one first network and at least one second network, wherein a) for at least one data transmission between the at least one first network and the at least one second network, at least one connection between the first network and the second network is established and a datum or data are directed by means of a resource allocation unit arranged between the networks, and b) for the establishment of the at least one connection, the resource allocation unit exclusively allocates at least one net access resource, e.g. network cards or network adapters, which can be coupled to the second net, and a one-way communication unit arranged upstream of the net access resource for establishing a feedback-free data transmission direction.

14 Claims, 2 Drawing Sheets

(56) References Cited

U.S. PATENT DOCUMENTS

Figure 1:
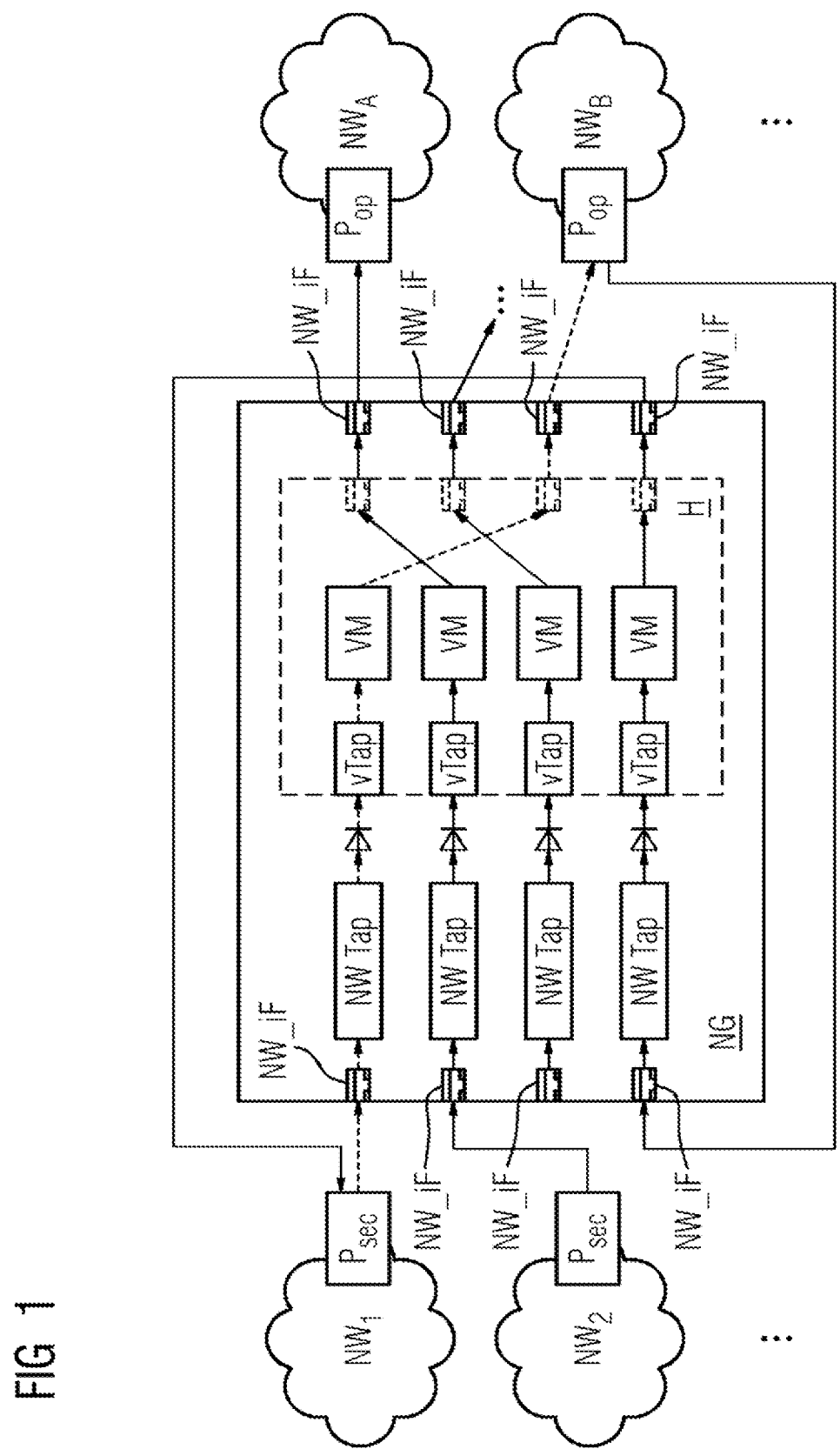

| | | | |
|---|---|---|---|
| 9,094,224 B2* | 7/2015 | Olofsson | H04L 45/18 |
| 10,749,790 B2* | 8/2020 | Mestery | H04L 45/24 |
| 10,958,723 B2* | 3/2021 | Zhang | H04L 49/201 |
| 2011/0004698 A1 | 1/2011 | Wu | |
| 2014/0201838 A1 | 7/2014 | Varsanyi et al. | |
| 2018/0115519 A1* | 4/2018 | Bonomi | H04L 63/1458 |
| 2019/0052600 A1* | 2/2019 | Park | H04L 49/552 |

FOREIGN PATENT DOCUMENTS

| | | |
|---|---|---|
| WO | 2019099088 A1 | 5/2019 |
| WO | WO-2022258640 A1 * | 12/2022 |

OTHER PUBLICATIONS

Wikipedia, "Hypervisor", Retrieved From Internet: https://en.wikipedia.org/wiki/Hypervisor, Published Jun. 19, 2019.

PCT International Search Report & Written Opinion dated Sep. 28, 2020 corresponding to PCT International Application No. PCT/EP2020/066620.

* cited by examiner

METHOD AND TRANSMISSION DEVICE FOR DATA TRANSMISSION BETWEEN TWO OR MORE NETWORKS

CROSS-REFERENCE TO RELATED APPLICATIONS

This application claims priority to PCT Application No. PCT/EP2020/066620, having a filing date of Jun. 16, 2020, which is based off of DE Application No. 10 2019 209 342.6, having a filing date of Jun. 27, 2019, the entire contents both of which are hereby incorporated by reference.

FIELD OF TECHNOLOGY

The following relates to a method for data transmission between at least one first network and at least one second network.

BACKGROUND

For secure communication between two or more networks, in particular a security-critical network and an open network, such as e.g. an industrial control network (or operational network) and a traditional IT network, for example one-way communication units, such as e.g. data diodes, can be used to allow a unidirectional data transmission. A data diode with a feedback channel, also referred to as a bidirectional network guard or security gateway, allows a secure data transfer between two information areas having different security levels. A network guard is generally a combination of hardware and software which allows—for example in comparison with known firewalls—a more restrictive data transmission between networks: a bidirectional network guard is generally set up so as to realize two mutually separate unidirectional data streams by means of one data diode each, the data streams flowing in opposite directions. This allows data exchange in both directions, wherein the one-way function is ensured in each case for each direction or transfer path. By way of example, a bidirectional network guard makes it possible to communicate data from a network having a high security requirement to an open network having a low security requirement or from the network having a low security requirement to a network having a high security requirement.

In the event of a data transfer from the network having a low security requirement to the network having a high security requirement, an additional check or validation is generally necessary in order to ensure the integrity and/or security of the network having a high security requirement and/or the network availability.

A data capture unit (DCU, www.siemens.com/dcu) represents a feedback-free network tap that can be used to realize unidirectional data transfers in a cost-effective manner. Via the tap connections of the DCU, it is possible to tap off messages in a feedback-free manner and thereby to realize unidirectional transmission paths of a network guard.

EP 19163812 has already proposed a bidirectional network protocol that realizes a network guard on the basis of two separate unidirectional transmission paths.

SUMMARY

An aspect relates to data exchange between two or more networks, to embody a data transmission from one network to the other more flexibly compared with the prior art mentioned in the introduction.

Embodiments of the invention comprise a method for data transmission between at least one first network and at least one second network, wherein
a) for at least one data transmission between the at least one first network and the at least one second network, at least one connection between the first network and the second network is established and a datum or data is or are directed via a resource allocation unit arranged between said networks, wherein
b) for the establishment of the at least one connection, the resource allocation unit exclusively allocates at least one network access resource, able to be coupled to the second network, and a one-way communication unit disposed upstream of the network access resource, for example a network card/adapter for WLAN and/or Ethernet, physical interfaces/insertion locations, serial interface, CPU, etc., for predefining a feedback-free data transmission direction.

The one-way communication unit can be embodied for example by means of an optical data diode or alternatively by a passive network tap of a DCU (e.g. data capture unit, www.siemens.com/dcu).

To put it another way, it is possible to establish one or a plurality of connection(s) from a first network of a plurality of possible first networks to one or a plurality of second networks (i.e. a 1 to m relationship). Moreover, it is possible to establish one or a plurality of connection(s) from a second network of a plurality of possible second networks to one or a plurality of first networks (i.e. an n to 1 relationship). Theoretically, n first and m second networks are conceivable, which can be related in an n to m relationship via the connections established. If a DCU is used, provision is made of four ports for the use of connections between networks. In an embodiment, the 1 to n possible first networks have a security requirement to be satisfied, wherein the 1 to m possible second networks have a security requirement to be satisfied that is different than that of the first networks. In general, the first networks have a higher security requirement than the second networks. Connections between two networks having an identical security requirement are also conceivable. By virtue of the fact that the at least one connection is established via a one-way communication unit, e.g. a network tap, which can be embodied as a data diode, the data transmission direction is predefined. That is to say that the data transmission can be directed depending on the arrangement and allocation of the one-way communication unit by the resource allocation unit, either from the first to the second network or from the second to the first network, unidirectionally and thus in a feedback-free manner. The network tap can be integrated into the abovementioned DCU.

The method is computer-implemented in embodiments. In association with embodiments of the invention, "computer-implemented" can be understood to mean an implementation of the method in which in particular a processor carries out at least one method step.

One development of embodiments of the invention provides for the at least one first network to satisfy a first security requirement and the at least one second network to satisfy a second security requirement, different in comparison with the first security requirement.

One development of embodiments of the invention provides for provision to be made of a virtual machine for the data transmission between said networks, which reconstructs payload data from the data received in the one-way communication unit, wherein the payload data are forwarded.

A virtual machine, abbreviated to VM, means that a computer system is encapsulated in terms of software within an executable computer system. The abstraction layer between a real or host computer system on which the virtual machine is executed and the virtual machine is called a hypervisor or virtual machine monitor. It is implemented purely on the basis of hardware, purely on the basis of software or by means of a combination of the two. The hypervisor generally allows the operation of a plurality of virtual machines simultaneously on one physical computer system.

One development of embodiments of the invention provides for provision to be made of a validation unit (VE) disposed downstream of the virtual machine, wherein the payload data are validated on the basis of a predefined rule, for example with regard to integrity, authenticity, signature, etc., in the validation unit and are forwarded in the event of positive validation.

One development of embodiments of the invention provides for provision to be made of a data lock-keeper disposed downstream of the validation unit, wherein, in the event of negative validation, the data lock-keeper prevents the forwarding of the payload data and optionally buffer-stores the payload data.

One development of embodiments of the invention provides for the data lock-keeper optionally to permit either a payload data transmission from the virtual machine to said data lock-keeper or a payload data transmission from said data lock-keeper to the allocated network access resource.

A further aspect of embodiments of the invention is a transmission device for data transmission between at least one first network and at least one second network, comprising:

a) at least one communication unit designed to the effect that for at least one data transmission between the at least one first network and the at least one second network, at least one connection between the first network and the second network is established and a datum or data is or are directed via a resource allocation unit arranged between said networks, and comprising b) the resource allocation unit for the establishment of the at least one connection, which is designed to exclusively allocate at least one network access resource, able to be coupled to the second network, and a one-way communication unit disposed upstream of the network access resource for predefining a feedback-free data transmission direction.

One development of embodiments of the invention provides for the network access resource to be designed for serial data transmission.

One property of embodiments of the method and of the transmission device is the exclusive allocation of network access resources to a virtual machine by the resource allocation unit. In this regard, the network access resources— which allow bidirectional communication—are allocated exclusively to the respective virtual machine. Even for the case where an attacker succeeds in monitoring the virtual machine (abbreviated to: VM) from the second network, said attacker cannot thereby directly access resources from the first network since there is no incoming (neither unidirectional nor bidirectional) connection into the first network. An attacker is "trapped" in the virtual machine in this case.

Embodiments of the invention overall enable a bidirectional gateway to be realized with little outlay by means of a combination of one-way communication units for feedback-free unidirectional transmission or transfer paths or connections and virtualization for a secure and efficient technical implementation of control functions on just one hardware platform.

The data capture unit (DCU) can be used as a hardware platform, wherein, besides a network access resource, resources such as dedicated CPU cores can also be exclusively allocated to each VM entity.

The embodiment variants shown are distinguished overall by:

secure network link by means of incoming and outgoing transfer paths or connections, wherein at least partial paths thereof are realized in each case by way of unidirectional coupling by means of the one-way communication unit.

Efficient technical realization possibilities by means of the use of taps instead of traditional diodes and the use of virtualization for realizing routing, allocation and optionally checking functions.

A unit or component, in particular a communication unit or network component, can be embodied as a hardware component. A component can comprise a processor.

A processor can be in particular a central processing unit (CPU), a microprocessor or a microcontroller, for example an application-specific integrated circuit or a digital signal processor, possibly in combination with a storage unit for storing program instructions, etc. A processor can for example also be an IC (integrated circuit) or a multi-chip module, in particular an FPGA (field programmable gate array) or an ASIC (application-specific integrated circuit), an SoC (system on chip), a graphic processing unit (GPU), a processor for evaluating a neural network such as, for example, a TPU (tensor processor unit), or a DSP (digital signal processor). The processor can comprise one or more computing core (multi-core). Moreover, a processor can be understood to mean a virtualized processor or a soft CPU. It can also be a programmable processor, for example, which is equipped with configuration steps for carrying out the stated method according to embodiments of the invention or is configured with configuration steps in such a way that the programmable processor implements the features according to embodiments of the invention of the method or of other aspects and partial aspects of embodiments of the invention. The processor can have tamper protection for protection against physical manipulations, e.g. tamper sensors for detecting physical attacks.

Furthermore, embodiments of the invention relate to a computer program product which is directly loadable into a programmable computer, comprising program code parts suitable for carrying out the steps of a computer-implemented method according to embodiments of the invention.

A computer program product, such as a computer program means, for example, can be provided or supplied for example as a storage medium or a data carrier, such as, for example, as a memory card, a USB stick, a CD-ROM, a DVD, or else in the form of a downloadable file from a server in a network.

The devices, facilities, units and/or apparatuses, modules and computer program (products) can be embodied according to the developments/embodiments of the abovementioned method and the developments/embodiments thereof, and vice versa.

BRIEF DESCRIPTION

Figure 2:
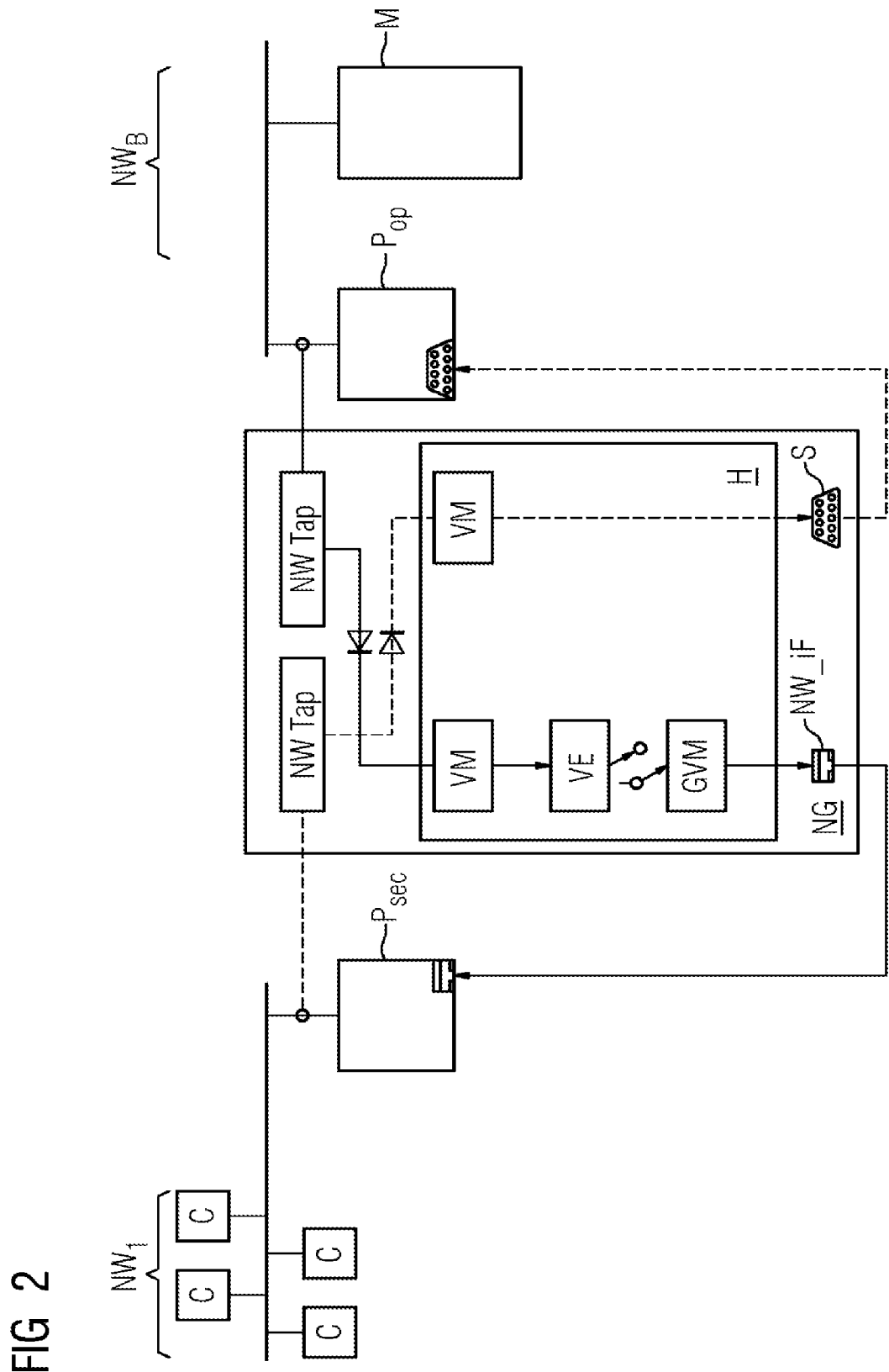

Some of the embodiments will be described in detail, with reference to the following figures, wherein like designations denote like members, wherein:

FIG. 1 shows a schematic illustration of a transmission device according to embodiments of the invention which is suitable for data transmission between two or more networks; and FIG. 2 shows a schematic illustration of a further embodiment of the transmission device according to embodiments of the invention.

DETAILED DESCRIPTION

FIG. 1 shows one embodiment of the transmission device according to embodiments of the invention which is suitable for data transmission between two or more networks.

Via a first transmission or transfer path or connection, identified by a dashed line, it is possible to transmit one datum or a plurality of data from a first, e.g. NW1, of a plurality of possible first networks NW1, NW2 to NWn, which, for example, complies with a high security requirement, e.g. an installation network (e.g. having installation components C), to a second network, e.g. NWB, of a plurality of possible second networks NWA, NWB to NWZ, which, for example, satisfies a lower security requirement compared with the first network, e.g. an open network (monitoring network having a monitoring unit, e.g. M). Conversely, a data transfer of one datum or of a plurality of data from one of the possible second networks, e.g. NWB, to one of the possible first networks, e.g. NW1, takes place via a second transmission path, identified by a solid line.

A plurality of such transmission paths are conceivable in each case. In the example, a transmission path is led from a proxy, e.g. Psec, of the first network via a network access resource NW_IF, e.g. a network card for Ethernet and/or WLAN or a serial interface, and via a network tap of a transmission device NG, also referred to as network guard, to a resource allocation unit H, also called hypervisor. From the resource allocation unit, the transmission path is led further via a network access resource NW_IF to a proxy, e.g. Pop, of the second network. Conversely, a transmission path can be led from the proxy Pop via said units or components to the proxy Psec. In this case, the datum or the data is or are directed unidirectionally via the transmission paths or links.

The network guard realizes and monitors the unidirectional transmission links between a first and a second network. In this case, the network guard comprises the following units/components that can be embodied in terms of hardware, firmware and/or software:
a. network tap NWTap
  (at least) two feedback-free network taps that can only read but not write/change a communication or data transmission on connected data connections.
b. Network access unit NW_IF or interface, wherein the first network interface is connected (bidirectionally) to the proxy Psec from the first network.
c. A further network access unit NW_IF, wherein the second network interface is connected (bidirectionally) to the proxy Pop from the second network.
d. A virtual machine VM
  a first virtual machine, via which an incoming or outgoing data transfer is regulated (unidirectionally) depending on the data transmission direction. The virtual machine VM can reconstruct the actual payload data from the recorded raw data—as described below under proxy Psec or Pop. In the present example, a transferred file is reconstructed in this step. Incoming network packets of the protocol are recognized and processed further. One advantageous embodiment according to embodiments of the invention provides for packets that do not correspond to the protocol to be recognized (these packets can provide indications of possible attacks to which accordingly it is necessary to react—for instance by way of alarms and subsequent actions in the context of an intrusion detection and/or prevention method).
e. Hypervisor H
  a hypervisor that regulates the resource management on the network guard. As described below, network interfaces and optionally also CPU (cores) are exclusively allocated to the virtual machines by the hypervisor.

The proxy Psec is a system component which initiates outgoing data transfers from the first network and receives incoming data transfers and processes them further or forwards them. The component generally has a dedicated network port, which is exclusively connected to the network guard, as shown in the figures.

Since the network tap cannot act as a communication partner (since it is purely passive and feedback-free), the transfer path between proxy Psec and network tap is designed to be strictly unidirectional, which can be ensured by way of a hardware property. As an alternative to the network tap, an optical data diode can also be used to transmit datum/data purely unidirectionally. A unidirectional protocol such as e.g. UDP or the protocol described in the patent application EP 19163812, cited in the introduction, can be used for the data transmission. The communication of the proxy Psec is intercepted via the network tap and recorded in a feedback-free manner. These "raw data" are subsequently passed on to the virtual machine VM. By virtue of the functional principle of the network tap, this partial path is realized in a strictly unidirectional and feedback-free manner. The actual payload data are accordingly embedded into a network guard protocol. In this regard, e.g. a file transfer can be effected by this means.

The proxy Pop is a system component which can act analogously to the proxy Psec for incoming data transfers and accordingly initiates data transfers into the second network and receives outgoing data transfers and processes them further or forwards them. The component is set up analogously to the proxy Psec, i.e. has a corresponding dedicated link to the network guard. The proxy Pop can interrogate the transmitted data from the virtual machine VM. This can be effected in a push- or pull-based manner. This partial path is generally realized in a bidirectional manner.

The essential protection objectives for industrial installations, in the example of one of the first networks, are generally the availability and integrity of the installation (correct, defined system behavior). In the case of a link to an open network, in the example of one of the second networks, an outgoing connection realized in a strictly unidirectional manner offers a high degree of security which is comparable with the level of a physical network separation. A unidirectional outgoing data transfer (the dashed connection in FIG. 1) can thus usually be permanently maintained by itself.

The protection objectives mentioned are exposed to a risk in particular as a result of the incoming connection (the solid transfer path in FIG. 1). As in the case of application level firewalls, it is necessary here, too, to monitor incoming transfers more precisely, i.e. to enable them only to a restricted extent (e.g. with regard to data types and data contents of transfers and temporal availability).

A data transmission between at least one first network NW1 and/or NW2 and at least one second network NWA and/or NWB takes place, wherein a) for at least one data transmission between the at least one first network and the at least one second network, at least one connection between the first network and the second network is established (see primarily the dashed transfer path) and a datum or data is or are directed via a resource allocation unit H arranged between said networks, wherein b) for the establishment of the at least one connection, the resource allocation unit H exclusively allocates at least one network access resource NWA_IF, able to be coupled to the second network, for predefining a feedback-free data transmission direction.

FIG. 2 shows an embodiment variant which takes up these requirements and additionally monitors incoming connections. For this purpose, the system set-up from FIG. 1 is extended by the following units and components:

validation unit VE: the latter performs the tasks of filtering incoming data transfers. Data transfers that arrive via the virtual machine VM are passed on to the validation unit VE by means of host-internal communication and are analyzed by said validation unit on the basis of a predefined rule. Only the data transfers which fulfil the rule are accepted and can be passed on later in the direction of proxy secure. Examples of such a rule for checking or validation are:

signature validation for firmware and software updates virus scans message checking: similarly to "deep packet inspection" approaches of application level firewalls, only selective requests/commands are allowed through in a rule-based manner.

Integrity

Authenticity

Data lock-keeper GVM:

This performs the functionality of a lock-keeper computer. This monitors the connection to the validation unit VE and thus has control over the establishment or interruption of the entire incoming transfer path (from the second to the first network). That is to say that the proxy Psec together with the data lock-keeper GVM controls whether the connection is made or interrupted. Maintenance accesses can thus be enabled temporarily from the first network in a monitored manner.

FIG. 2 shows a further embodiment of the invention. The proxy Pop is linked via a serial interface S as an embodiment of a network access resource NW_IF. This makes it more difficult for attackers to carry out attacks on the network guard (or the hypervisor, for instance) via standard network interfaces. The link of the proxy Pop is generally maintained via a network access resource NW_IF. This variant affords the advantage that outgoing transfers can be carried out at a higher transfer rate (since a serial interface offers lower transfer rates in comparison with Ethernet interfaces). This is advantageous particularly if a concrete implementation requires a higher data transfer from the first network into the second network and data have to be transferred from the second network into the first network to a lesser extent and/or less frequently.

Although embodiments of the invention has been more specifically illustrated and described in detail by means of the preferred exemplary embodiment, nevertheless embodiments of the invention is not restricted by the examples disclosed and other variations can be derived therefrom by the person skilled in the art, without departing from the scope of protection of embodiments of the invention.

The above-described processes or method sequences can be implemented on the basis of instructions present on computer-readable storage media or in volatile computer memories (referred to hereinafter in combination as computer-readable storage units). Computer-readable storage units are for example volatile memories such as caches, buffers or RAM and also nonvolatile memories such as exchangeable data carriers, hard disks etc.

In this case, the above-described functions or steps can be present in the form of at least one instruction set in/on a computer-readable storage unit. In this case, the functions or steps are not tied to a specific instruction set or to a specific form of instruction sets or to a specific storage medium or to a specific processor or to a specific execution schemes and can be executed by software, firmware, microcode, hardware, processors, integrated circuits, etc., in standalone operation or in any desired combination. In this case, a wide variety of processing strategies can be used, for example serial processing by a single processor or multiprocessing or multitasking or parallel processing, etc.

The instructions can be stored in local storage units, but it is also possible to store the instructions on a remote system and to access them via a network.

The transmission device can comprise one or more processors. The term "processor", "central signal processing", "control unit" or "data evaluation means" encompasses processing means in the broadest sense, that is to say for example servers, universal processors, graphics processors, digital signal processors, application-specific integrated circuits (ASICS), programmable logic circuits such as FPGAs, discrete analog or digital circuits and any desired combinations thereof, including all other processing means that are known to the person skilled in the art or will be developed in the future. In this case, processors can consist of one or more devices or facilitates or units. If a processor consists of a plurality of devices, the latter can be designed or configured for parallel or sequential processing or execution of instructions.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for data transmission between at least one first network and at least one second network, wherein
   a) for at least one data transmission between the at least one first network and the at least one second network, at least one connection between the first network and the second network is established and a datum or data is or are directed via a resource allocation unit arranged between the networks,
   wherein
   b) for the establishment of the at least one connection, the resource allocation unit exclusively allocates at least one network access resource, able to be coupled to the second network, and a one-way communication unit disposed upstream of the network access resource, for predefining a feedback-free data transmission direction.

2. The method as claimed in claim 1, wherein the at least one first network satisfies a first security requirement and the at least one second network satisfies a second security requirement, different in comparison with the first security requirement.

3. The method as claimed in claim 1, wherein provision is made of a virtual machine for the data transmission between the networks, which reconstructs payload data from the data received in the one-way communication unit, wherein the payload data are forwarded.

4. The method as claimed in claim 3, wherein provision is made of a validation unit disposed downstream of the virtual machine, wherein the payload data are validated on the basis of a predefined rule in the validation unit and are forwarded in the event of positive validation.

5. The method as claimed in claim 4, wherein provision is made of a data lock-keeper disposed downstream of the validation unit, wherein, in the event of negative validation, the data lock-keeper interrupts or prevents the forwarding of the payload data and optionally buffer-stores the payload data.

6. The method as claimed in claim 5, wherein the data lock-keeper permits a payload data transmission, directed via the virtual machine, from the virtual machine to the data lock-keeper and/or a payload data transmission from the data lock-keeper to the allocated network access resource.

7. A transmission device for data transmission between at least one first network and at least one second network, comprising:
   a) at least one communication unit designed to the effect that for at least one data transmission between the at least one first network and the at least one second network, at least one connection between the first network and the second network is established and a datum or data is or are directed via a resource allocation unit arranged between the networks, and
   b) the resource allocation unit for the establishment of the at least one connection, which is designed to exclusively allocate at least one network access resource, able to be coupled to the second network, and a one-way communication unit disposed upstream of the network access resource for predefining a feedback-free data transmission direction.

8. The transmission device as claimed in claim 7, wherein the at least one first network satisfies a first security requirement and the at least one second network satisfies a second security requirement, different in comparison with the first security requirement.

9. The transmission device as claimed in claim 7, further comprising a virtual machine for the data transmission between the networks, which is designed to reconstruct payload data from the data received in the one-way communication unit, wherein the payload data is forwarded.

10. The transmission device as claimed in claim 9, further comprising a validation unit disposed downstream of the virtual machine, wherein the payload data can be validated on the basis of a predefined rule in the validation unit and can be forwarded in the event of positive validation.

11. The transmission device as claimed in claim 10, further comprising a data lock-keeper disposed downstream of the validation unit, wherein, in the event of negative validation, the data lock-keeper can interrupt or prevent the forwarding of the payload data and optionally buffer-store the payload data.

12. The method as claimed in claim 11, wherein the data lock-keeper permits a payload data transmission directed via the virtual machine and/or a payload data transmission from the data lock-keeper to the allocated network access resource.

13. The transmission device as claimed in claim 7, wherein the network access resource is designed for serial data transmission.

14. A computer program product comprising: a computer readable hardware storage device having computer readable program code stored therein, the program code executable by a processor of a computer system to implement a method for data transmission between at least one first network and at least one second network, wherein
   a) for at least one data transmission between the at least one first network and the at least one second network, at least one connection between the first network and the second network is established and a datum or data is or are directed via a resource allocation unit arranged between the networks, wherein
   b) for the establishment of the at least one connection, the resource allocation unit exclusively allocates at least one network access resource, able to be coupled to the second network, and a one-way communication unit disposed upstream of the network access resource, for predefining a feedback-free data transmission direction.

* * * * *